US012188637B1

(12) United States Patent
Cacciabeve

(10) Patent No.: US 12,188,637 B1
(45) Date of Patent: Jan. 7, 2025

(54) PORTABLE LIGHT

(71) Applicant: Walter R. Tucker Enterprises, Ltd., Deposit, NY (US)

(72) Inventor: Robert Cacciabeve, Denville, NJ (US)

(73) Assignee: Walter R. Tucker Enterprises, Ltd, Deposit, NY (US)

( * ) Notice: Subject to any disclaimer, the term of this patent is extended or adjusted under 35 U.S.C. 154(b) by 0 days.

(21) Appl. No.: 18/819,576

(22) Filed: Aug. 29, 2024

Related U.S. Application Data

(60) Provisional application No. 63/535,421, filed on Aug. 30, 2023.

(51) Int. Cl.

| | |
|---|---|
| ***F21V 21/088*** | (2006.01) |
| ***F21L 4/00*** | (2006.01) |
| ***F21V 21/096*** | (2006.01) |
| ***F21V 21/30*** | (2006.01) |
| ***F21V 21/40*** | (2006.01) |

(52) U.S. Cl.
CPC ............ *F21V 21/0885* (2013.01); *F21L 4/00* (2013.01); *F21V 21/0965* (2013.01); *F21V 21/30* (2013.01); *F21V 21/406* (2013.01)

(58) Field of Classification Search
CPC .. F21V 21/0885; F21V 21/0965; F21V 21/30; F21V 21/406; F21L 4/00
USPC ........................................ 362/197, 396, 398
See application file for complete search history.

(56) References Cited

U.S. PATENT DOCUMENTS

| | | | | |
|---|---|---|---|---|
| 5,467,261 A * | 11/1995 | Whetstone | F21V 15/02 | 362/396 |
| 5,568,968 A * | 10/1996 | Jaramillo | F21V 21/145 | 362/396 |
| 7,320,537 B1 * | 1/2008 | Stillwaugh | F21L 14/02 | 362/398 |
| 2006/0082990 A1 * | 4/2006 | Hsu | F21L 4/045 | 362/157 |
| 2007/0086192 A1 * | 4/2007 | Huang | F21L 14/026 | 362/269 |

FOREIGN PATENT DOCUMENTS

| | | | |
|---|---|---|---|
| CA | 2789155 A1 * | 8/2011 | F21L 4/027 |

* cited by examiner

*Primary Examiner* — Laura K Tso
(74) *Attorney, Agent, or Firm* — Breiner & Breiner, L.L.C.

(57) ABSTRACT

A portable light having a swivel light, a handle and a swivel arm. The portable light will rotate in a number of directions and may be held in the hand or attached by one or more magnets to a metal surface.

7 Claims, 14 Drawing Sheets

SECTION A-A

PORTABLE LIGHT

RELATED APPLICATION

This application claims benefit of U.S. Provisional Application Ser. No. 63/535,421, filed Aug. 30, 2023, entitled "Portable Light," which application is incorporated herein by reference in its entirety.

FIELD OF THE INVENTION

The present invention relates to a portable light. More particularly, the invention relates to a handheld light which rotates in a number of directions and which may be attached by one or more magnets to a metal surface.

BACKGROUND OF THE INVENTION

Portable lights are known, including as disclosed, for example, in E-Z Red Company's U.S. Pat. No. 11,125,421, entitled "Clamping Work Light," and U.S. Pat. No. 10,962,180 entitled "Handheld Clamp Work Light," which are incorporated herein by reference in their entirety.

SUMMARY OF THE INVENTION

A primary object of the invention is to provide a new and unique portable light.

Another primary object of the invention is to provide a handheld light which rotates in a number of directions and which may be attached by one or more magnets to a metal surface.

The invention is directed to a portable light comprising a swivel light, a handle, and a swivel arm. The swivel light and the swivel arm are adapted to be attached to the handle. The swivel light is adapted to rotate/swivel on the handle, and the swivel arm is adapted to rotate up and down on the handle. The portable light is adapted to be hand held. The swivel arm of the portable light may include one or more magnets such that the portable light may be attached to a metal surface.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

DETAILED DESCRIPTION OF THE PREFERRED EMBODIMENTS

Figure 1:
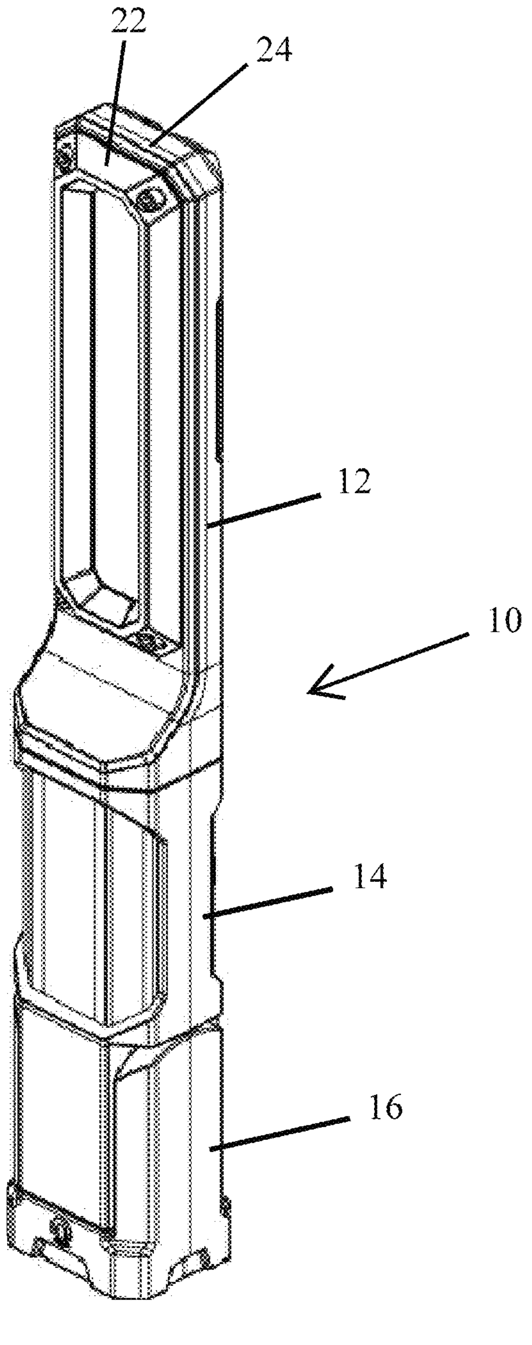
FIG. 1 is a front and side perspective view of the portable light of the invention.
Figure 2:
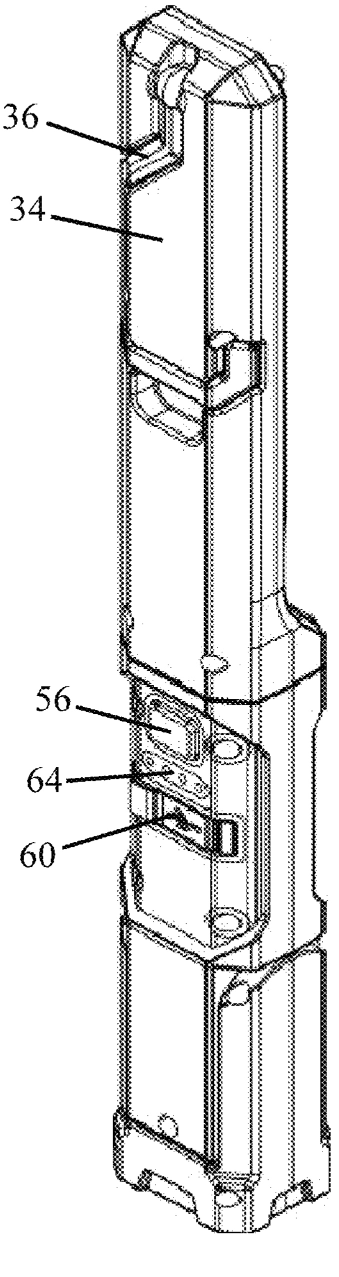
FIG. 2 is a back and side perspective view of the portable light of FIG. 1.

Referring to the drawings, there is shown a new and unique handheld light which rotates in a number of directions and which may be attached by one or more magnets to a metal surface.

The portable light 10 includes a swivel light 12, a handle 14 and a swivel arm 16. FIGS. 12-15 show an exploded view of each of these components and the construction of the portable light 10.

Figure 13:
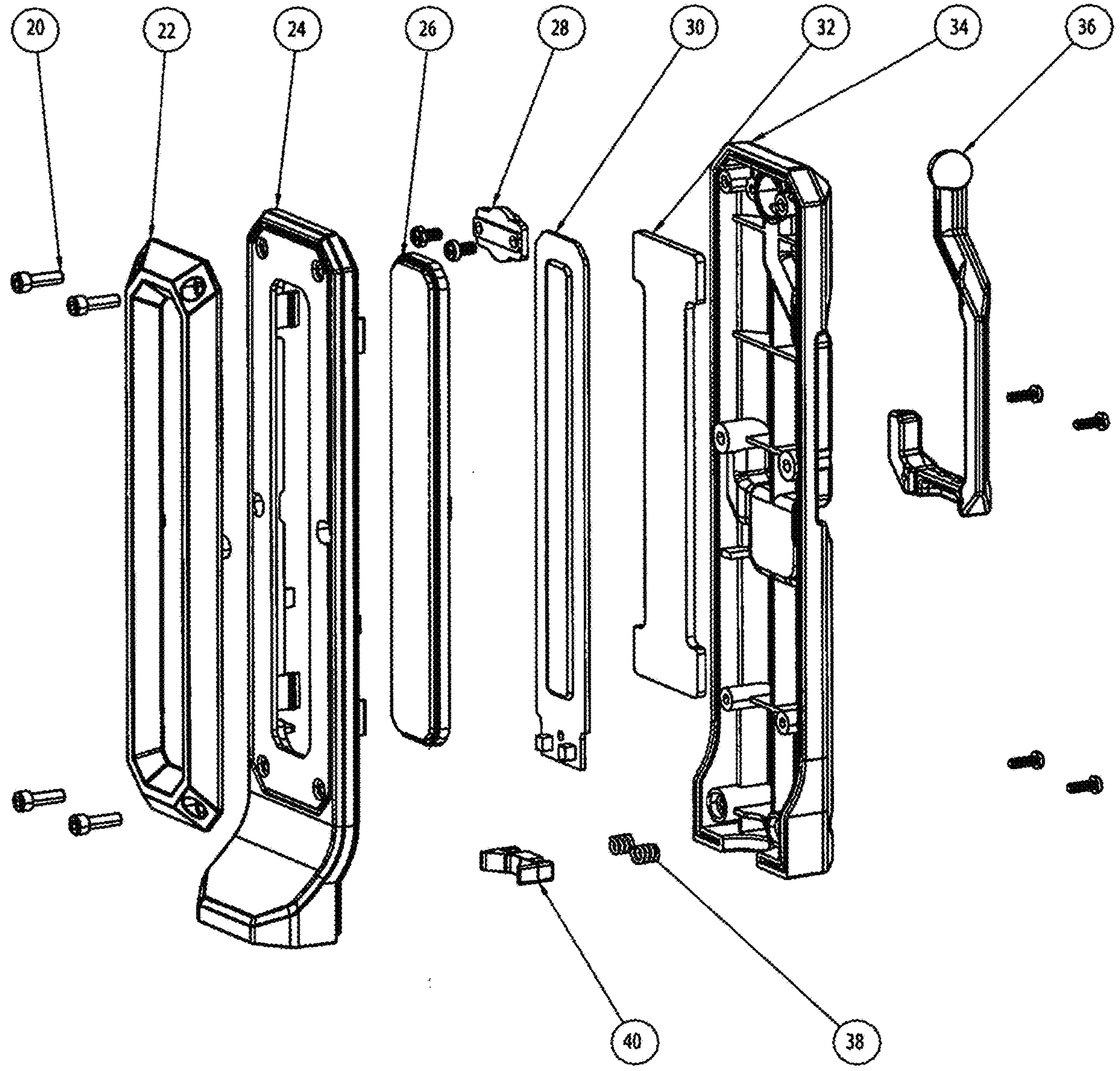
FIG. 13 is an exploded view of the swivel light of FIG. 12.

Referring to FIG. 13, the swivel light 12 includes the following components: hardware 20, reflector 22, front light body cover 24, lens 26, hook anchor 28, LED 30, aluminum heat sink 32, rear light body cover 34, hook 36, pivot anchor spring 38, and pivot anchor 40.

Figure 14:
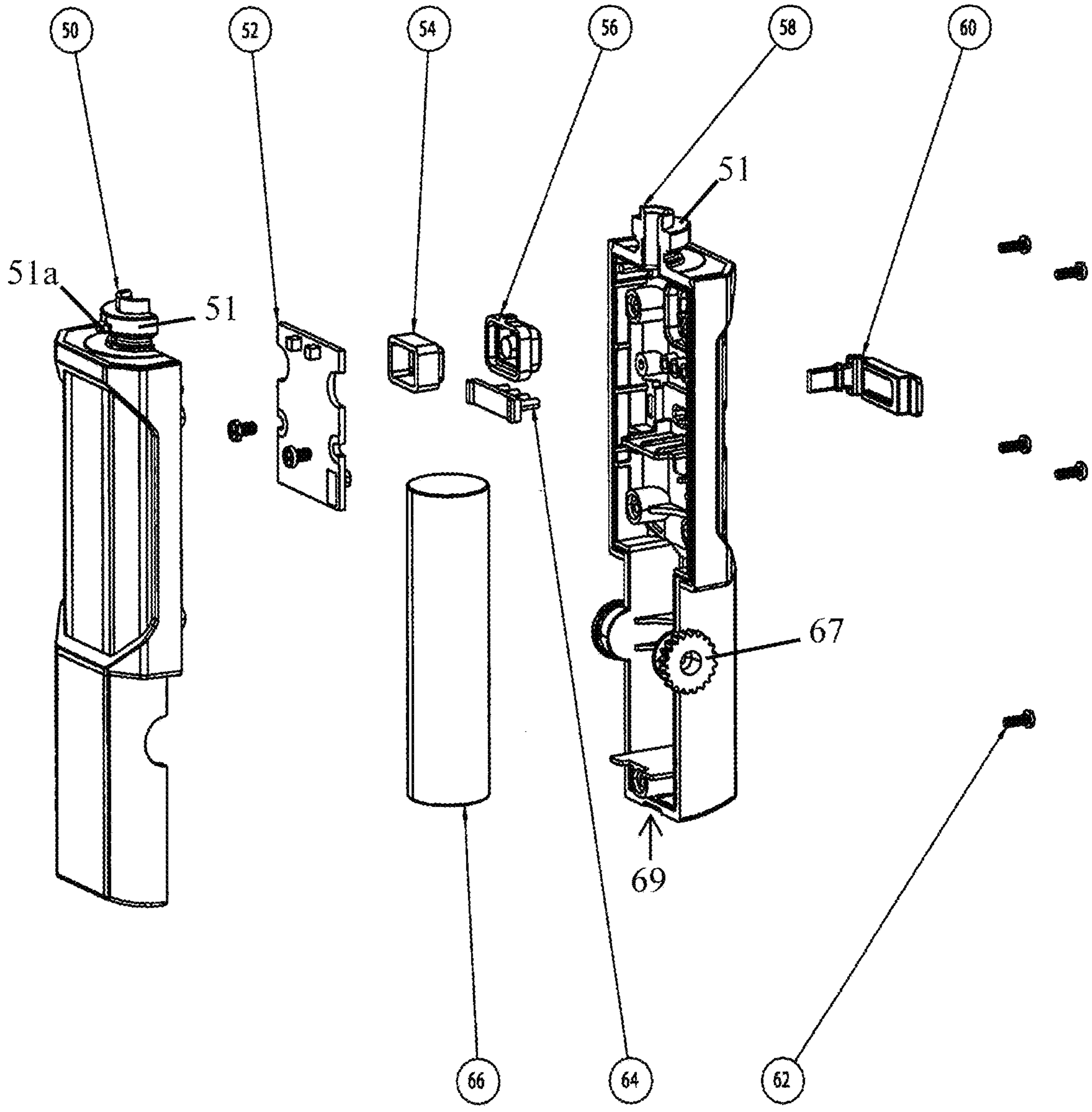
FIG. 14 is an exploded view of the handle of FIG. 12.

Referring to FIG. 14, the handle 14 includes the following components: front handle 50, swivel ring 51 and swivel bump stop 51*a*, PCB 52, button spacer 54, button 56, rear handle 58, charge port cover 60 covering USB charging port, hardware 62, charge indicator cover 64 covering charging indictor, rechargeable battery 66, ratchet ring 67 and friction lock 69.

Figure 15:
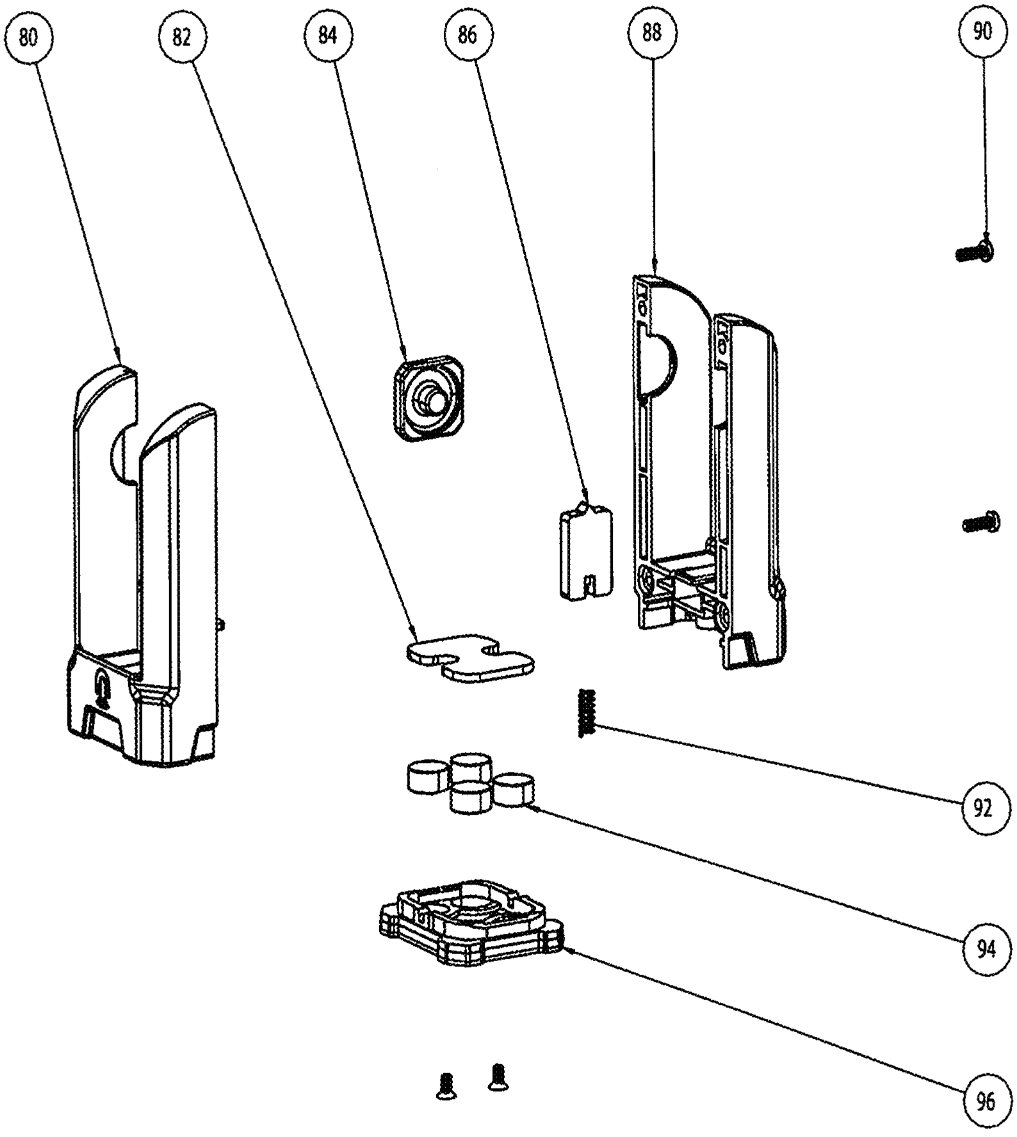
FIG. 15 is an exploded view of the swivel arm of the portable light of FIG. 12.

Referring to FIG. 15, the swivel arm 16 includes the following components: front swivel arm 80, steel plate 82, friction insert 84, ratcheting insert 86, rear swivel arm 88, hardware 90, spring 92, magnets 94, and baseplate 96.

Figure 3A:
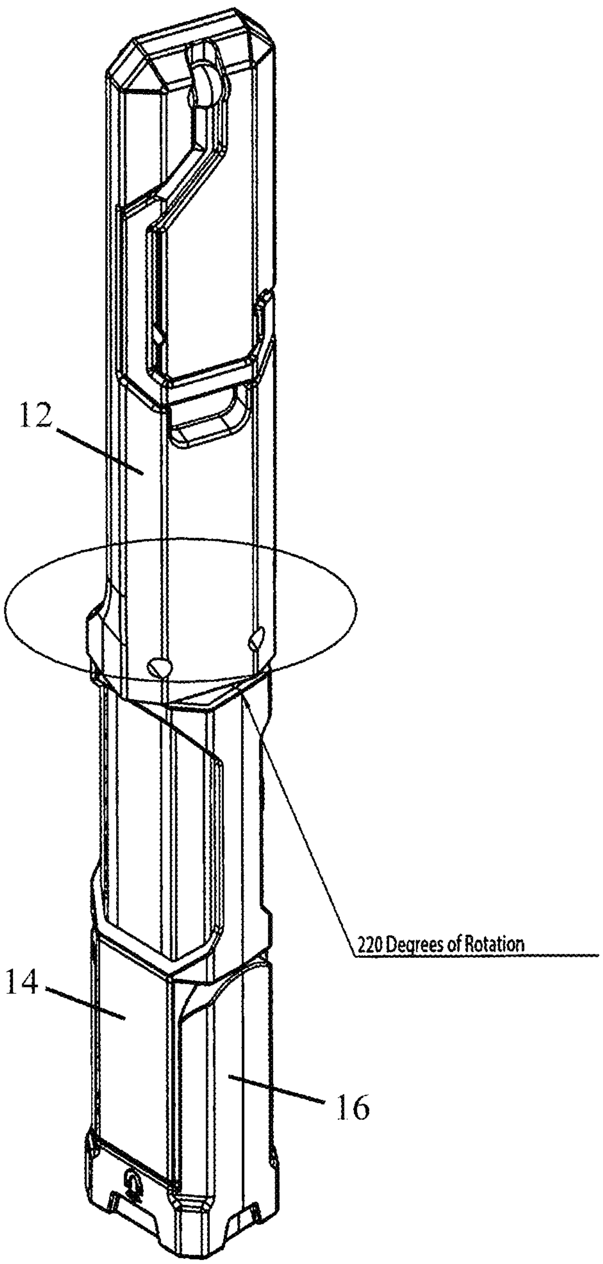
FIG. 3A is a perspective view of the portable light of FIG. 1 showing 220 degrees of rotation of the swivel light.
Figure 3B:
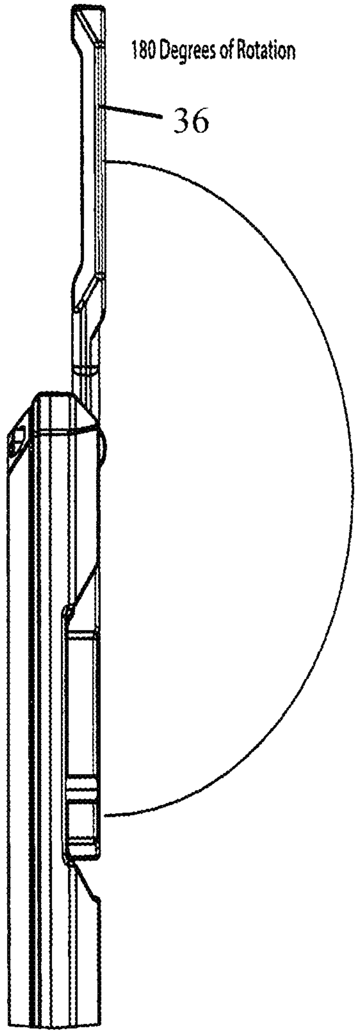
FIG. 3B is a partial side view of the portable light of FIG. 1 showing 180 degrees of rotation of the hook.
Figure 3C:
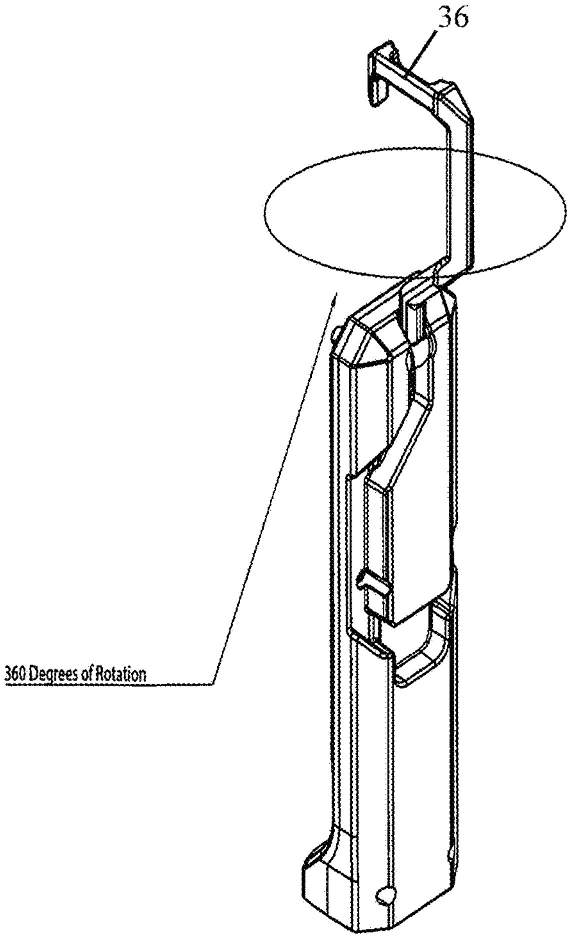
FIG. 3C is a back and side perspective view of the portable light of FIG. 3B showing 360 degrees of rotation of the hook.
Figure 3D:
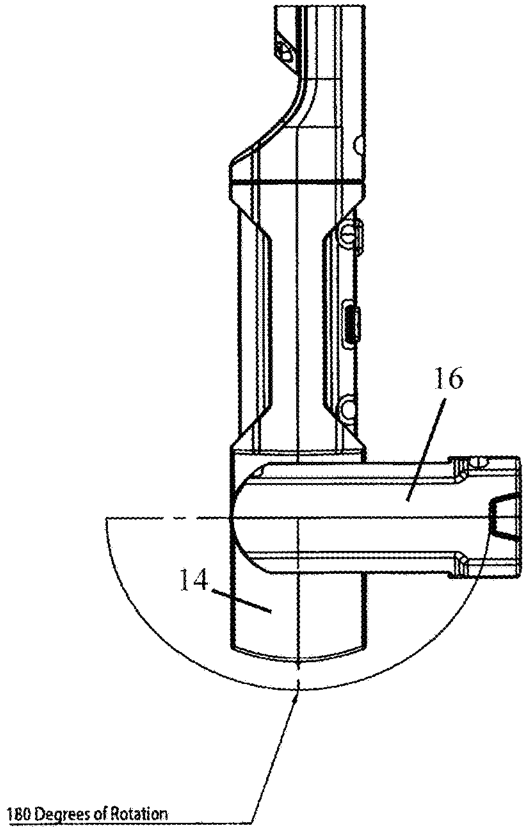
FIG. 3D is a partial side view of the portable light of FIG. 1 showing 180 degrees of rotation of the swivel arm.
Figure 4:
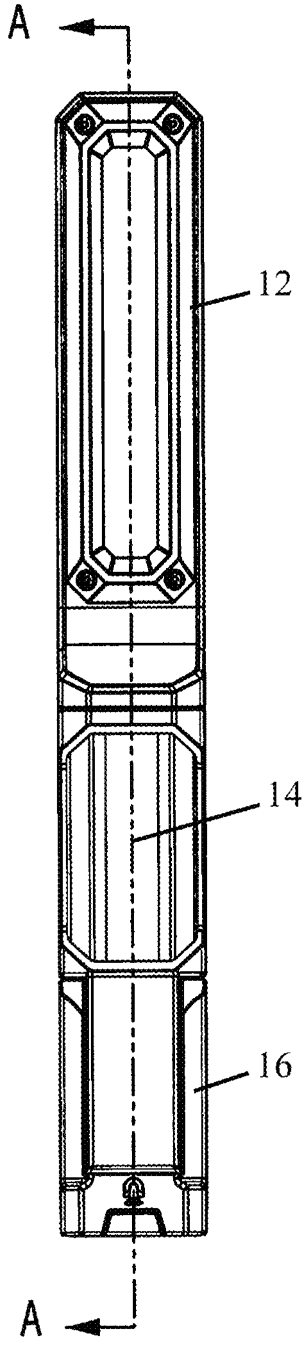
FIG. 4 is a front view of the portable light of FIG. 1.
Figure 5:
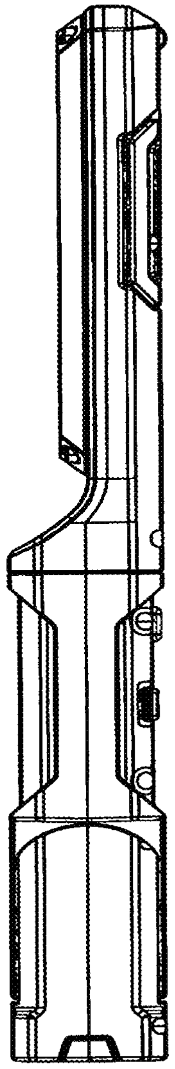
FIG. 5 is a side view of the portable light of FIG. 1.
Figure 6:
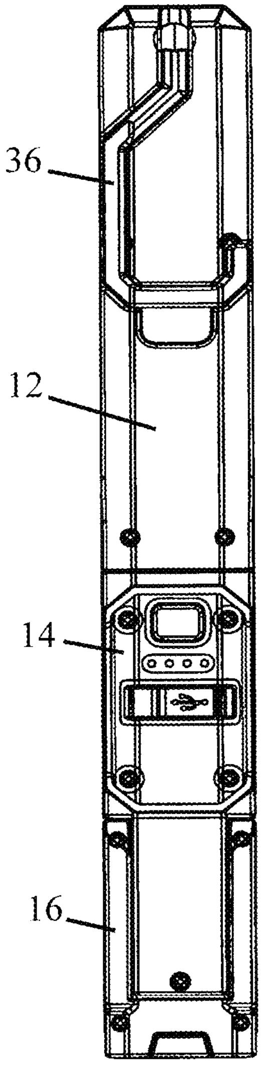
FIG. 6 is a back view of the portable light of FIG. 1.
Figure 7:
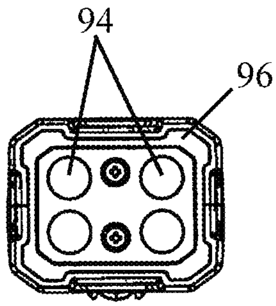
FIG. 7 is a bottom view of the portable light of FIG. 1.
Figure 8:
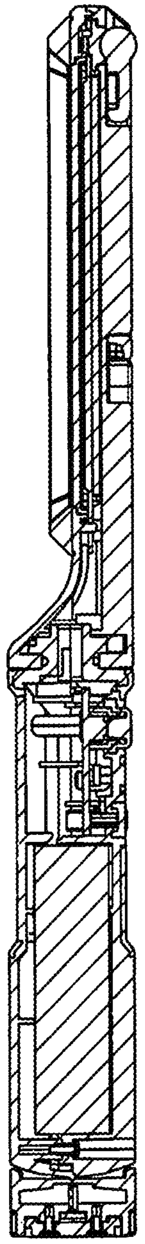
FIG. 8 is a cross section of the portable light of FIG. 4 taken along lines A-A.
Figures 9A, 9B:
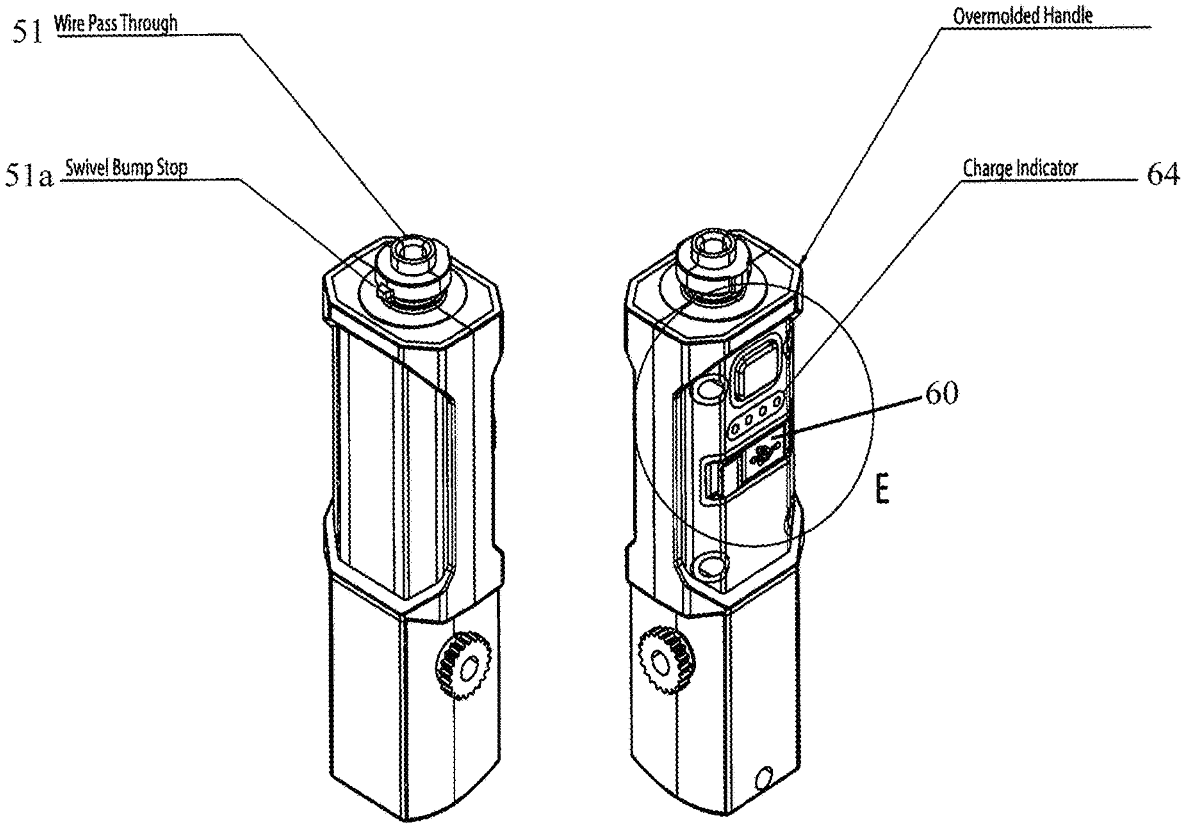
FIG. 9A is a front and side perspective view of the handle of the portable light of FIG. 1.
FIG. 9B is a side and back perspective view of the handle of FIG. 9A.
Figure 9C:
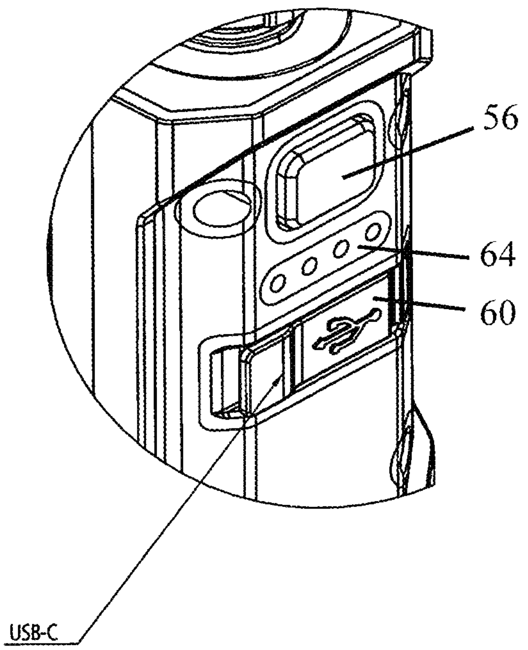
FIG. 9C is a close up view of section E of FIG. 9B.
Figure 9D:
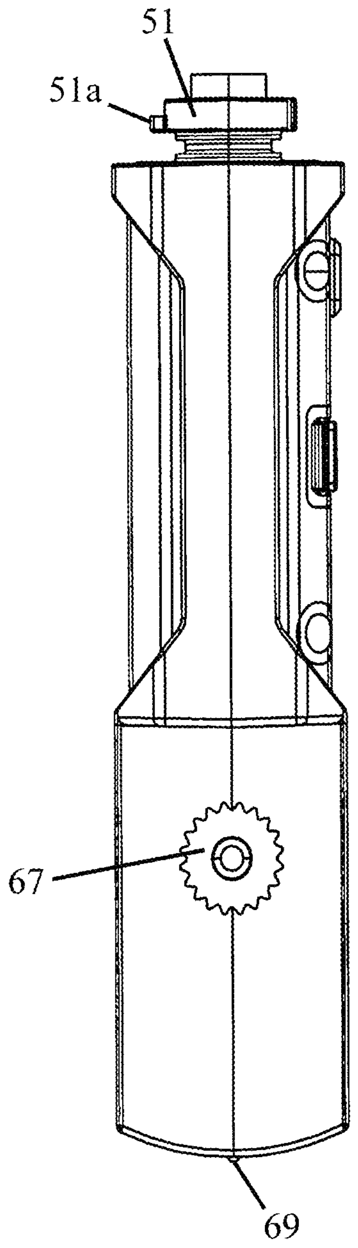
FIG. 9D is a side view of the handle of FIG. 9A.
Figure 10C:
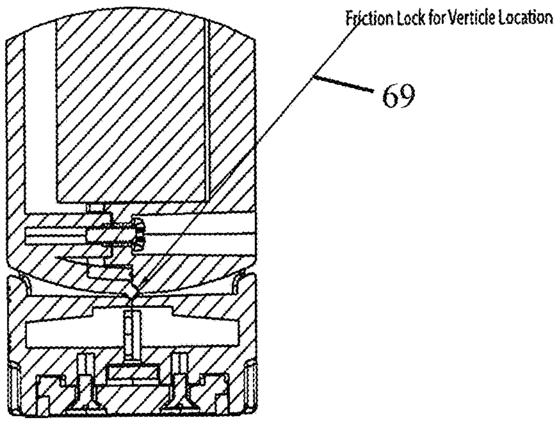
FIG. 10C is a close up view of section C of FIG. 10B.
Figure 10A:
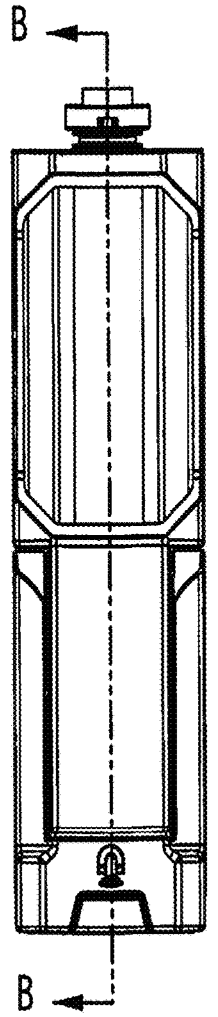
FIG. 10A is a front view of the handle of FIG. 9A.
Figure 10B:
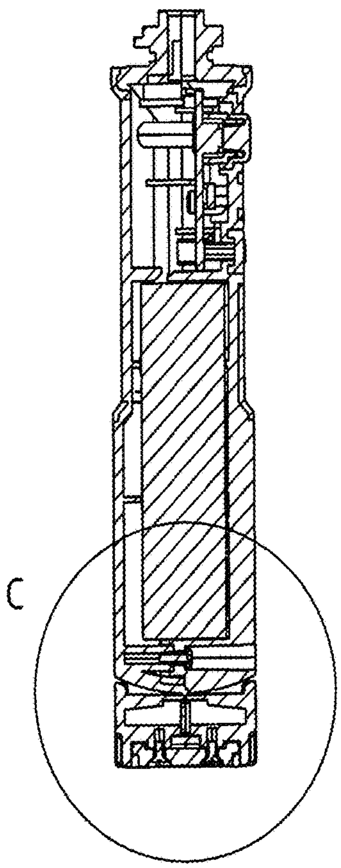
FIG. 10B is a cross section of the handle of FIG. 10A taken along lines B-B.
Figure 10D:
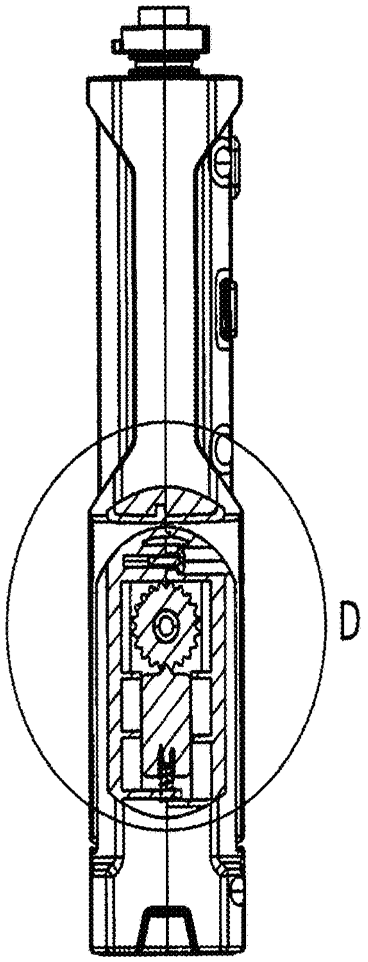
FIG. 10D is a partial cross section view of FIG. 9D.
Figure 10E:
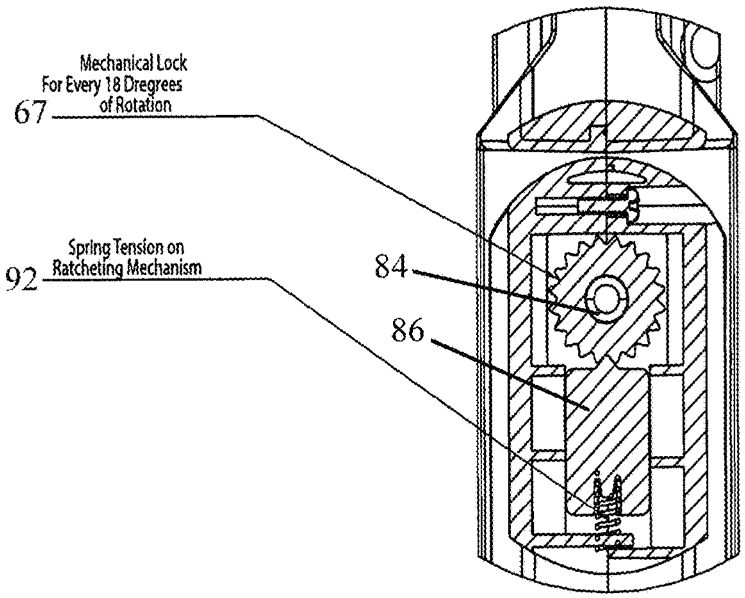
FIG. 10E is a close up view of section D of FIG. 10D.
Figure 11A:
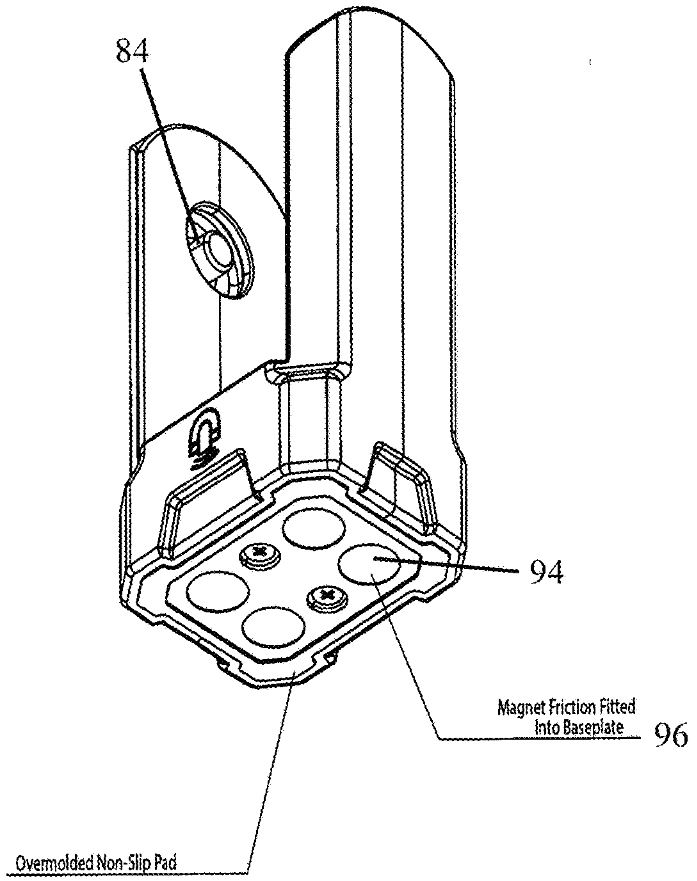
FIG. 11A is a perspective view of the swivel arm of the portable light of FIG. 1.
Figure 11B:
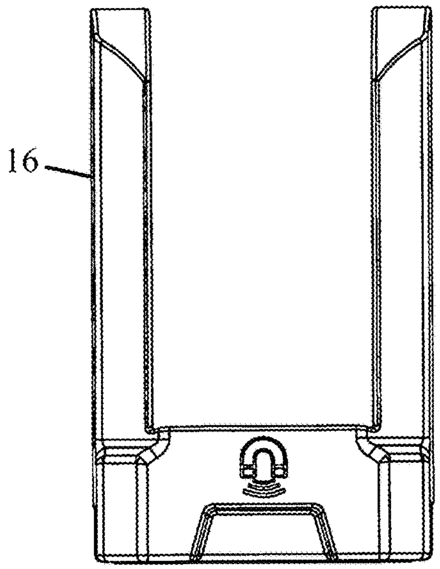
FIG. 11B is a front view of the swivel arm of FIG. 11A.
Figure 11C:
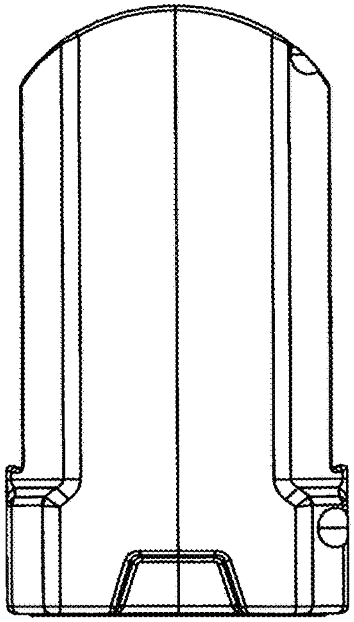
FIG. 11C is a side view of the swivel arm of FIG. 11A.
Figure 12:
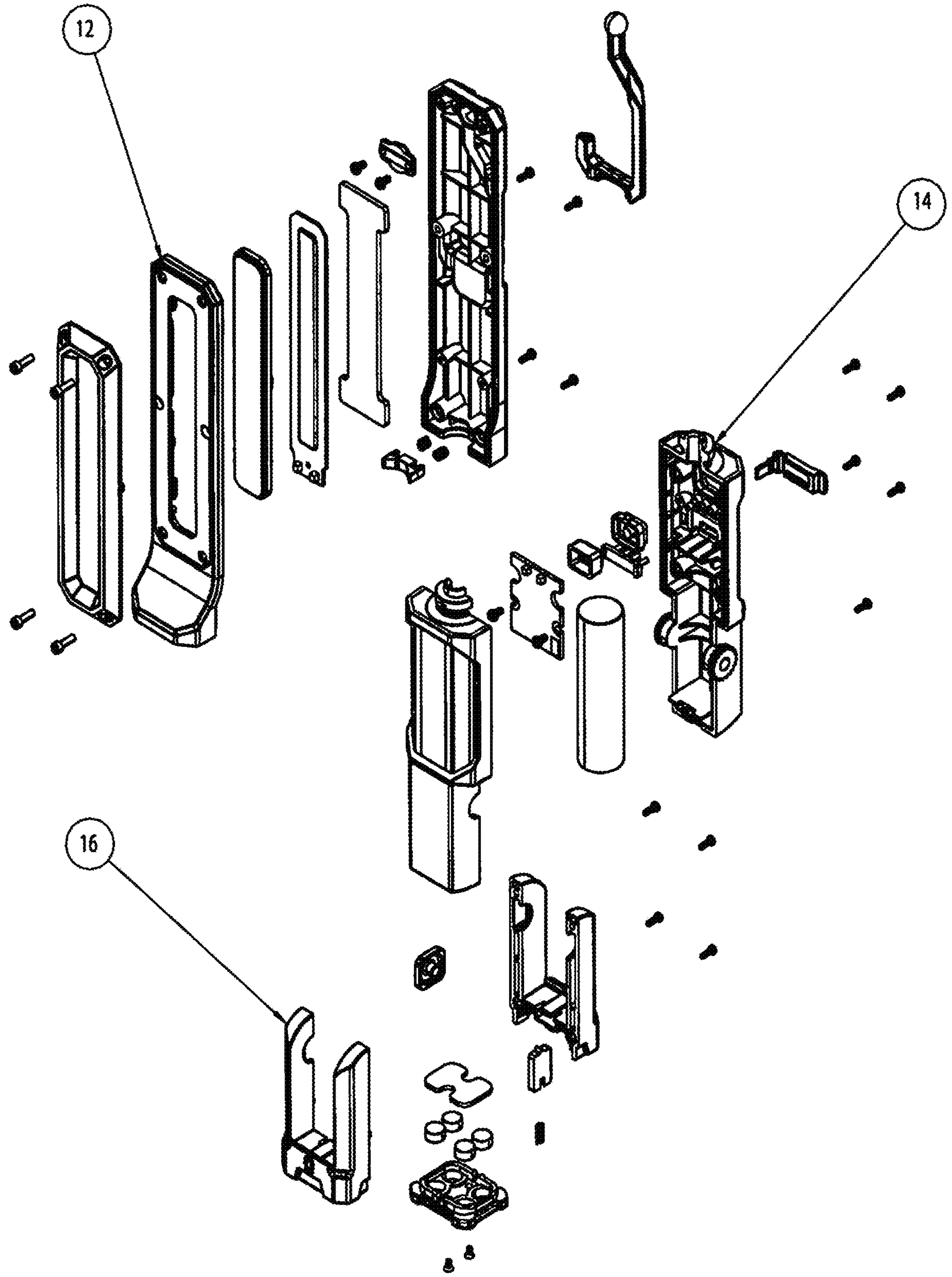
FIG. 12 is an exploded view of the portable light of FIG. 1 showing the swivel light, the handle and the swivel arm.

As seen in the drawings, the swivel light 12 is attached to handle 14 in a set position, e.g., FIG. 1, and will rotate or swivel about 220 degrees in two directions for focusing the light as shown in FIG. 3A. The swivel arm 16 is attached to handle 14 and will rotate or swivel 180 degrees, preferably by a ratcheting movement to allow the handle to stop at multiple positions, e.g., five positions in either direction. The swivel arm 16 includes one or more magnets 94 in the bottom, preferably four magnets, to allow the portable light 10 to attach to a metal surface, e.g. swivel arm 16 may be rotated 90 degrees and the bottom of the swivel arm with the magnets is attached to a metal surface. The handle 14 includes a rechargeable power source, a charging port, a charging indicator and a power on and off switch with preferably three different light intensity settings. The portable light further includes a hook for hanging the light and stored in a recess in the back of the swivel light, including as shown in FIGS. 3B and 3C.

More specifically, the swivel mechanism for allowing swivel light 12 to rotate or swivel on handle 14 comprises swivel ring 51 having swivel bump stop 51*a*, pivot anchor 40 and pivot anchor swivel spring 28 as shown, for example, in FIGS. 9A, 10A, 13 and 14. Swivel arm 16 rotates on handle 14 by a ratcheting mechanism comprising ratchet ring 67, friction insert 84, ratcheting insert 86 and ratchet spring 92 as shown, for example, in FIGS. 10E, 11A, 14 and 15.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention and are embraced by the appended claims.

The invention claimed is:

1. A handheld portable light comprising a swivel light, a handle, and a swivel arm wherein the swivel light is adapted to be attached to the top of the handle and the swivel light is adapted to rotate on the handle, wherein the swivel arm is adapted to be attached to side walls of the handle and is adapted to rotate up and down on the handle, and wherein the swivel arm includes one or more magnets at a bottom surface of the swivel arm and the portable light is adapted to be hand held and attached magnetically to a metal surface.

2. The handheld portable light of claim 1 wherein the swivel light includes a light body, LED light, a hook adapted to rotate into and out of a storage position and pivot when out of the storage position.

3. The handheld portable light of claim 2 wherein the handle includes a rechargeable battery, a PCB, a charge port, a charge indicator and an on/off button.

4. The handheld portable light of claim 3 wherein the swivel arm includes a swivel arm housing wherein the housing includes a base plate of four magnets.

5. The handheld portable light of claim 1 wherein the swivel light is adapted to rotate 220 degrees.

6. The handheld portable light of claim 1 wherein the swivel arm is adapted to rotate 180 degrees.

7. The handheld portable light of claim 6 wherein the swivel arm is adapted to rotate by ratcheting movement.

* * * * *